US009458700B2

(12) United States Patent
Wille et al.

(10) Patent No.: US 9,458,700 B2
(45) Date of Patent: Oct. 4, 2016

(54) USE OF UNDERGROUND GAS STORAGE TO PROVIDE A FLOW ASSURANCE BUFFER BETWEEN INTERLINKED PROCESSING UNITS

(75) Inventors: Hein Wille, Eze (FR); Harke Jan Meek, Tourette-Levens (FR)

(73) Assignee: SINGLE BUOY MOORINGS INC., Marly (CH)

( * ) Notice: Subject to any disclaimer, the term of this patent is extended or adjusted under 35 U.S.C. 154(b) by 12 days.

(21) Appl. No.: 13/262,980

(22) PCT Filed: Apr. 2, 2010

(86) PCT No.: PCT/NL2010/050173
§ 371 (c)(1),
(2), (4) Date: Oct. 5, 2011

(87) PCT Pub. No.: WO2010/117265
PCT Pub. Date: Oct. 14, 2010

(65) Prior Publication Data
US 2012/0024391 A1 Feb. 2, 2012

(30) Foreign Application Priority Data

Apr. 6, 2009 (EP) .................................... 09157423

(51) Int. Cl.
*E21B 43/40* (2006.01)
*E21B 43/34* (2006.01)
(Continued)

(52) U.S. Cl.
CPC ............. *E21B 41/0007* (2013.01); *B65G 5/00* (2013.01); *E21B 43/40* (2013.01); *Y10T 137/0318* (2015.04)

(58) Field of Classification Search
CPC ........ E21B 43/40; E21B 43/34; E21B 17/01; E21B 43/16; E21B 43/12; E21B 43/00
USPC ....... 166/351, 352, 357, 366, 266, 267, 268, 166/369
See application file for complete search history.

(56) References Cited

U.S. PATENT DOCUMENTS 4,375,835 A * 3/1983 Archer ................ B63B 35/4413
166/339
5,025,860 A * 6/1991 Mandrin ................ B63B 35/44
166/267
(Continued)

FOREIGN PATENT DOCUMENTS

GB 2 462 125 A 1/2010

OTHER PUBLICATIONS

International Search Report, dated Oct. 11, 2010, from corresponding PCT application.

*Primary Examiner* — Matthew R Buck
*Assistant Examiner* — Edwin Toledo-Duran
(74) *Attorney, Agent, or Firm* — Young & Thompson (57) ABSTRACT

A system for developing offshore hydrocarbon fields includes a floating hydrocarbon processing unit moored to the seabed and connected to a hydrocarbon reservoir via a riser and a wellhead on the seabed, the unit receiving and processing the hydrocarbon mixture received from the reservoir via the riser, and having equipment to separate the hydrocarbon mixture into oil, water and gas and store them in storage tanks. A gas storage buffer reservoir is placed at a distance from and isolated from the hydrocarbon reservoir. A gas export riser is connected to the floating hydrocarbon processing unit and the gas buffer reservoir to export separated gas and inject it into the gas buffer reservoir. A gas riser has one end connected to the gas buffer reservoir and another end connected to the floating gas processing unit for processing gas received from the gas buffer reservoir for enabling transportation to shore.

14 Claims, 5 Drawing Sheets

(51) Int. Cl.
   *E21B 17/01*   (2006.01)
   *E21B 43/16*   (2006.01)
   *E21B 43/00*   (2006.01)
   *E21B 41/00*   (2006.01)
   *B65G 5/00*   (2006.01)

(56) References Cited

U.S. PATENT DOCUMENTS

| | | | | |
|---|---|---|---|---|
| 5,477,924 A * | 12/1995 | Pollack | ............... | E21B 41/005 166/267 |
| 5,549,164 A * | 8/1996 | Blandford | ............ | E21B 43/017 166/344 |
| 6,003,603 A * | 12/1999 | Breivik | ............... | B63B 21/508 166/267 |
| 6,012,530 A * | 1/2000 | Korsgaard | ............ | B63B 22/026 166/352 |
| 6,230,809 B1 * | 5/2001 | Korsgaard | ............ | B63B 22/026 166/352 |
| 6,250,244 B1 * | 6/2001 | Dubar | ............... | F25J 1/0022 114/264 |
| 6,345,672 B1 * | 2/2002 | Dietzen | ............... | B63B 27/20 175/206 |
| 6,517,290 B1 * | 2/2003 | Poldervaart | ............ | B63B 21/50 114/230.1 |
| 6,698,989 B2 * | 3/2004 | Snowdon | ............... | B63B 27/24 175/206 |
| 6,745,856 B2 * | 6/2004 | Simpson | ............... | B09B 1/00 175/206 |
| 6,796,379 B1 * | 9/2004 | Martin | ............... | E21B 21/001 166/356 |
| 6,973,948 B2 * | 12/2005 | Pollack | ............... | B63B 21/50 141/284 |
| 7,017,506 B2 * | 3/2006 | van Wijngaarden | ... | F17C 3/005 114/256 |
| 7,066,219 B2 * | 6/2006 | Poldervaart | ............ | B63B 27/24 114/230.15 |
| 7,080,673 B2 * | 7/2006 | Pollack | ............... | F17C 5/06 141/284 |
| 7,119,460 B2 * | 10/2006 | Poldervaart | ............ | F17C 7/04 307/149 |
| 7,506,702 B1 * | 3/2009 | Patterson | ............ | B63B 35/28 114/26 |
| 7,628,224 B2 * | 12/2009 | D'Souza | ............... | B63B 35/44 114/144 B |
| 7,673,577 B2 * | 3/2010 | Poldervaart | ............ | B63B 27/24 114/230.1 |
| 7,975,769 B2 * | 7/2011 | Pollack | ............... | B63B 21/502 114/230.1 |
| 2002/0134455 A1 * | 9/2002 | Emblem | ............... | B63B 27/24 141/1 |
| 2003/0051875 A1 * | 3/2003 | Wilson | ............... | B65G 5/005 166/268 |
| 2003/0221827 A1 * | 12/2003 | Brady | ............... | E21B 43/385 166/265 |
| 2004/0238176 A1 * | 12/2004 | Appleford | ............ | E21B 7/128 166/353 |
| 2005/0241729 A1 * | 11/2005 | Poldervaart | ............ | B63B 27/24 141/387 |
| 2006/0010910 A1 * | 1/2006 | Hubbard | ............... | F17C 3/04 62/611 |
| 2006/0283590 A1 * | 12/2006 | Poldervaart | ............ | B63B 35/44 166/265 |

* cited by examiner

USE OF UNDERGROUND GAS STORAGE TO PROVIDE A FLOW ASSURANCE BUFFER BETWEEN INTERLINKED PROCESSING UNITS

FIELD OF THE INVENTION

The present invention relates to a system for the development of an offshore hydrocarbon field comprising
- at least one floating hydrocarbon production unit that is moored to the seabed and connected to a hydrocarbon reservoir via risers and a wellhead on the seabed, the unit receiving and processing the hydrocarbon mixture received from the reservoir via the riser, the floating hydrocarbon processing unit being provided with process equipment to separate from the received hydrocarbon mixture the oil, water and gas and provided with storage tank for storage of the separated oil,
- a gas export riser connected to the floating hydrocarbon processing unit to export the separated gas from the hydrocarbon processing unit, and
- a floating gas processing unit for processing and liquefying the gas received so that it can be transported to shore.

The present invention also relates to a method of loading, treating and distributing a hydrocarbon mixture collected from a hydrocarbon reservoir, comprising the steps of:
- receiving via a riser an hydrocarbon mixture on at least one floating production unit that is moored to the seabed,
- processing the oil and the gas on the floating production unit provided with process equipment to separate from the received hydrocarbon mixture the oil, water and gas,
- storing the separated oil in the storage tanks provided on the floating production unit,
- exporting the separated gas from the floating production unit,
- liquefying the separated gas on floating gas processing unit, and
- transporting the liquefied gas to shore,

BACKGROUND OF THE INVENTION

In offshore production of hydrocarbons (oil and/or gas) it is known to supply natural gas from an underground source to a field installation for gas treatment, the gas after possible purification being transferred in compressed form from the field installed on to a LNG tanker, where at least a part of the gas is liquefied before being transferred to storage tanks on board the tanker. For a further description of this system reference may e.g. be made to U.S. Pat. No. 6,003,603

U.S. Pat. No. 6,434,948 describes a system for production, storage and export of liquid natural gas (LNG) from an Floating Production Storage and Offloading (FPSO) vessel with an LNG liquefaction plant to an LNG tank. The LNG tank is provided with a buffer storage capacity for temporary storage of the continuously produced LNG during the absence of an LNG tank vessel.

In these known systems, nothing is mentioned on how to deal with the remaining gas produced after oil processing.

The present solution permits to eliminate expensive and non environmentally friendly solutions such as gas re-injection or flaring to get rid of the associated gas produced on the field development. The present invention also proposes a solution which would enable an offshore hydrocarbon production unit and an offshore liquefaction unit to work in conjunction, with no interdependence between their activities which increases the system uptime and reliability.

SUMMARY OF THE INVENTION

The invention provides a system for the development of an offshore hydrocarbon field comprising:
- at least one floating hydrocarbon processing unit that is moored to the seabed and connected to a hydrocarbon reservoir via risers and a wellhead on the seabed, the unit receiving and processing the hydrocarbon mixture received from the reservoir via the riser, the floating hydrocarbon processing unit being provided with process equipment to separate from the received hydrocarbon mixture the oil, water and gas and provided with storage tanks for storage of the separated oil,
- a gas storage buffer reservoir placed at a certain distance from and isolated from the hydrocarbon reservoir,
- a gas export riser connected to the floating hydrocarbon processing unit and the gas buffer reservoir to export the separated gas from the hydrocarbon processing unit and inject the gas into the gas buffer reservoir for temporary storage of the produced gas, and
- a gas riser connected with one end to the gas buffer reservoir and with another end connected to a floating gas processing unit that processes and liquefies the gas received from the gas buffer reservoir so that the gas can be transported to shore as LNG.

The invention also provides a method of loading, treating and distributing an hydrocarbon mixture collected from an hydrocarbon reservoir, comprising the steps of:
- receiving via a riser an hydrocarbon mixture on at least one floating production unit that is moored to the seabed,
- processing the oil and the gas on the floating production unit provided with process equipment to separate from the received hydrocarbon mixture the oil, water and gas,
- storing the separated oil in the storage tanks provided on the floating production unit,
- exporting the separated gas from the floating production unit to at least one storage buffer reservoir placed at a certain distance from and isolated from the hydrocarbon reservoir,
- extracting the gas via a gas riser from the gas buffer reservoir to a floating gas processing unit,
- processing and liquefying the gas received from the gas buffer reservoir, and
- transporting the liquefied gas to shore.

The use of a storage buffer reservoir placed at a certain distance from and isolated from the hydrocarbon reservoir is proposed according to the present invention as it provides a temporary storage for gas in case of production interruption on either unit. In a case where the floating hydrocarbon production unit is installed ahead of the floating gas processing unit, the separated gas can be re-injected into the gas storage buffer reservoir as a temporary outlet until the floating gas processing unit is in operation. The buffer gas reservoir has the advantage to control the gas flow between a floating hydrocarbon production unit and a floating gas processing unit working in conjunction in an associated gas field development.

By means of the method according to the invention there is also a possibility to unlock additional gas reserves that were previously considered stranded.

BRIEF DESCRIPTION OF THE DRAWINGS

The invention will be further described below in connection with exemplary embodiments with reference to the accompanying drawings, wherein.

DESCRIPTION OF THE PREFERRED EMBODIMENTS

Figure 1:
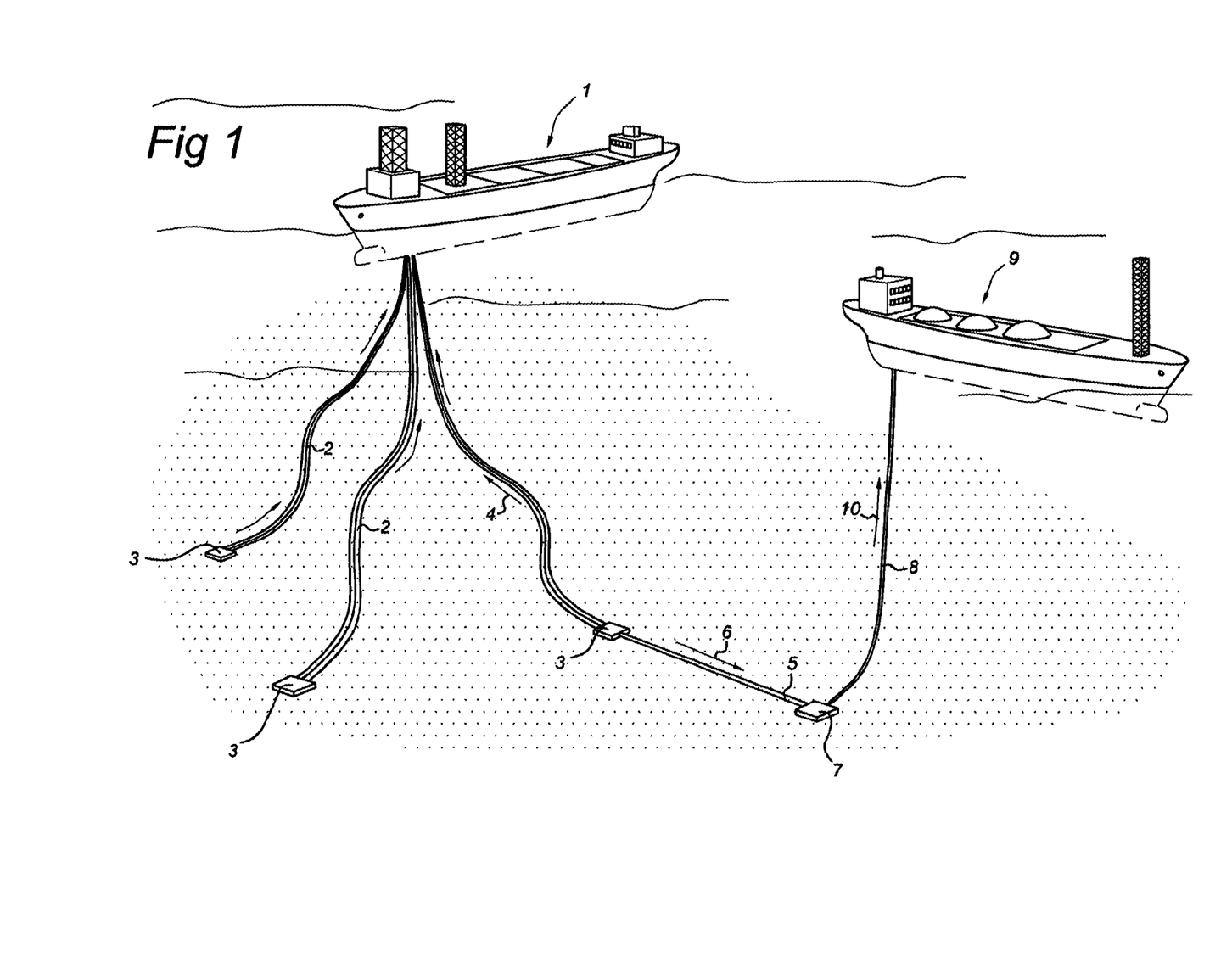
FIG. 1 shows a view of a system for the development of an offshore hydrocarbon field according to the present invention.

FIG. 1 shows a view of a system for the development of an offshore hydrocarbon field according to the present invention. The system shown in FIG. 1 comprises a floating production unit 1 that is moored to the seabed (not shown) and connected via risers 2 to several wellheads 3 on the seabed, the unit 1 receiving and processing the hydrocarbon mixture received from the reservoir via the risers 2, (see arrows 4).

The floating hydrocarbon processing unit 1 is provided with process equipment to separate from the received hydrocarbon mixture the oil, water and gas and is also provided with storage tanks for storage of the separate oil. Once the oil, water and gas are separated on the floating production unit 1, one gas export riser 5 connected to the floating unit 1 exports the separated gas (see arrows 6) from the hydrocarbon processing unit and the gas is then injected into a gas buffer reservoir 7 for temporary storage of the produced gas. As clearly shown in FIG. 1 the gas storage buffer reservoir 7 is placed at a certain distance from and isolated from the hydrocarbon reservoirs 3.

The gas storage buffer reservoir 7 is also connected to a gas riser 8 that transports the gas extracted from the gas buffer reservoir 7 to a floating gas processing unit 9 (see arrow 10). The floating gas processing unit is provided with a liquefaction plant so that the gas received from the gas buffer reservoir 7 can be processed to be transported to shore as liquefied gas.

Figure 2:
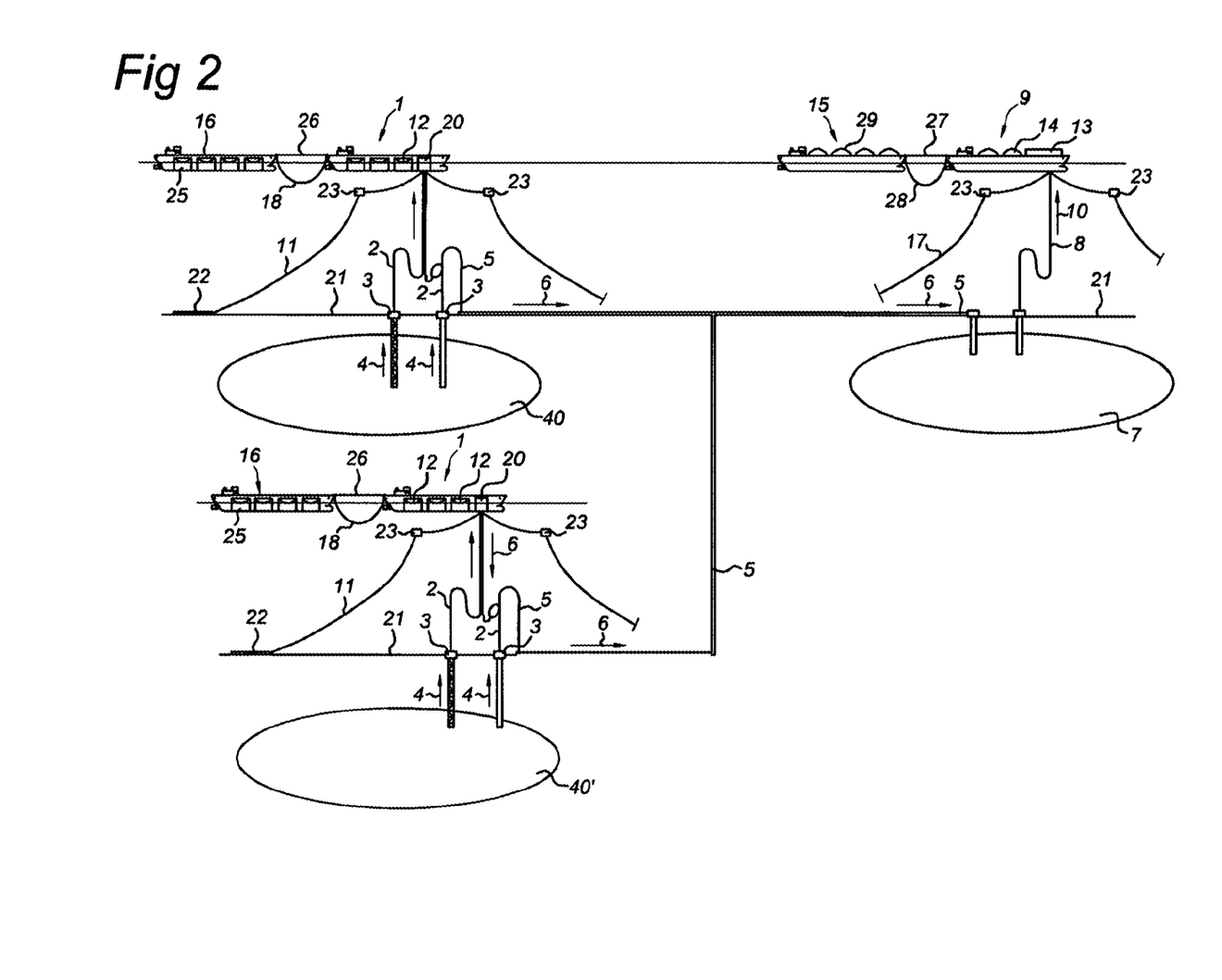
FIG. 2 shows a schematic view of a similar system with two floating hydrocarbon production units.

FIG. 2 shows a schematic view of a similar system with two floating production units 1. Each unit 1 is anchored to the seabed via a mooring system comprising mooring lines 11 connected to chain sections 22 at the seabed 21. Buoyancy elements 23 are attached to the mooring lines 11 to facilitate the mooring. This mooring system is ideal in deep water environments, however according to the invention this is just one embodiment to possible mooring systems for the floating production units 1, any type of mooring systems, permanent mooring system, disconnectable mooring system could also be convenient. A number of risers 2 extend between the seabed 21 and a turret 20 locate in the unit hull, the risers 2 at the bottom being connected to respective well heads 3, installed on two different production wells. In this case the risers comprise two risers 2 that bring an hydrocarbon mixture to the turret on the floating production unit 1. The floating production units 1 are provided with process equipment to separate, from the received hydrocarbon mixture, the oil, water and gas and are also provided with storage tanks 12 for storage of the separate oil. Oil shuttle tankers 16 are used to transport the produced oil from the floating production units 1. Between the floating production unit 1 and the oil shutter tanker 16, a transferring means 18 is arranged to transport the oil to tanks 25 on board the oil tanker 16. The oil shuttle tanker 16 is moored to the floating production unit 1 by means of a mooring line 26.

As already shown in FIG. 1, a gas export riser 5 connected to the floating unit 1 exports the separated gas (see arrows 6) from the hydrocarbon processing unit 1 and the gas is then injected into a gas buffer reservoir 7 for temporary storage of the produced gas. Each gas export riser 5 from each floating hydrocarbon processing unit 1 is connected to the other before reaching the gas buffer reservoir 7. The gas buffer reservoir 7 can be a salt cavern, a depleted reservoir or any other type of underground reservoir placed at a certain distance from and isolated from the hydrocarbon reservoir.

In FIG. 2 one a gas riser 8 is shown, connected, on one side, to the gas buffer reservoir 7 and to the other side to a floating gas processing unit 9. In this case the gas processing unit 9 is a LNG carrier provided with a gas liquefaction plant 13, with some storage tanks 14. The floating gas processing unit is hence able to process, liquefy and store the liquefied gas. In the embodiment shown on FIG. 2, the floating gas processing unit 9 is moored to a LNG carrier 15 by means of a mooring line 27. Between the floating gas processing unit 9 and the LNG carrier 15, a liquefied gas transferring means 28 is arranged to transport the liquefied gas to tanks 29 on board the LNG carrier 15. The LNG carrier 15 is then used to transport the liquefied gas from the gas processing unit 9 to shore.

Figure 3:
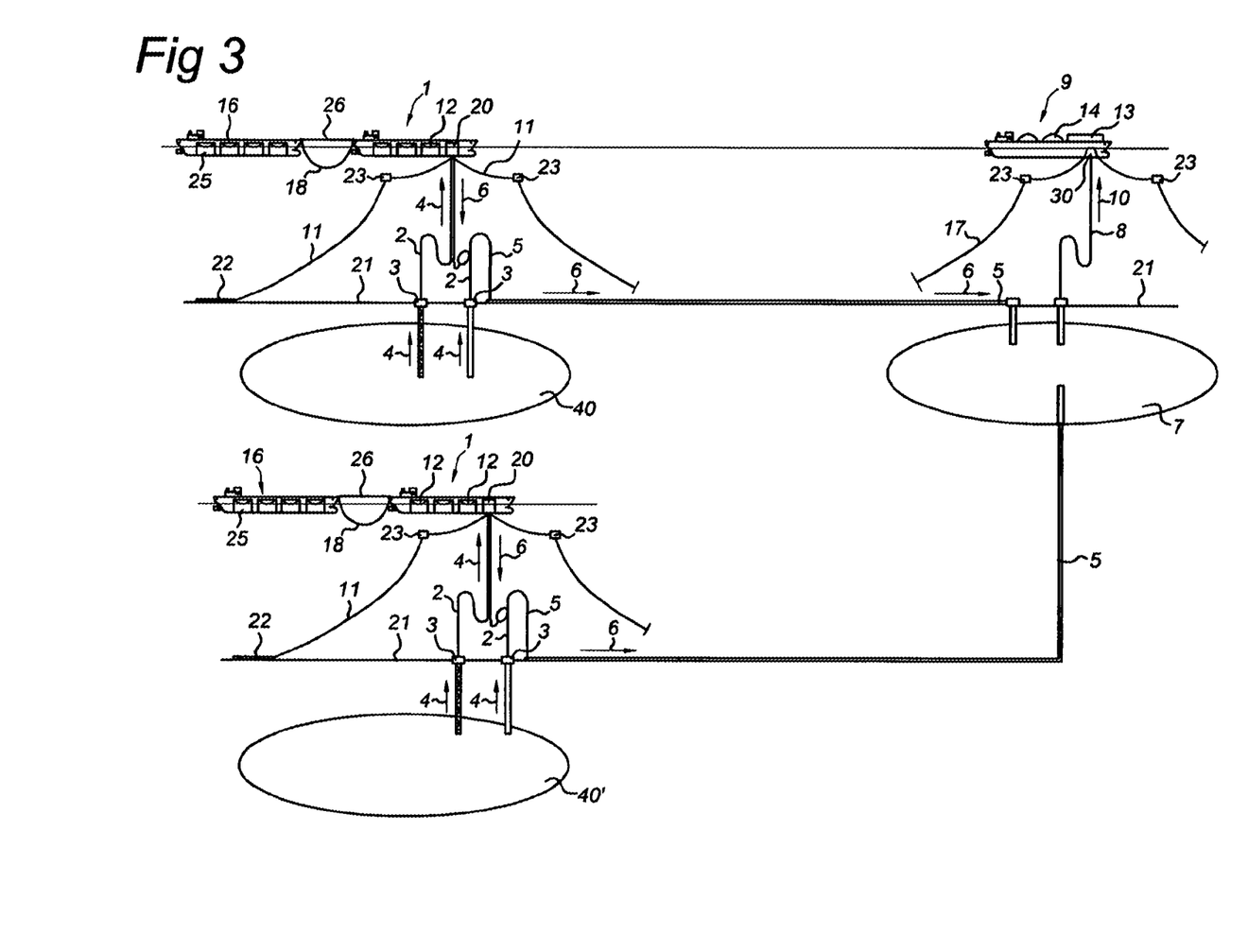
FIG. 3 shows another schematic view of a similar system as the one shown in FIG. 2, the floating gas processing unit being moored to a disconnectable buoy.

FIG. 3 shows another schematic view of a similar system as the one shown in FIG. 2, the floating gas processing unit 9 being moored to a disconnectable buoy 30. As shown in FIG. 2 there are two floating hydrocarbon processing units 1, each moored to oil shutter tankers 16. In this case, the gas buffer reservoir 7 is connected to two gas export risers 5, each having an independent connection to the gas buffer reservoir 7 and each connected to one floating hydrocarbon processing unit 1. In this case as well the gas processing unit 9 is a LNG carrier provided with a gas liquefaction plant 13, with some storage tanks 14. The floating gas processing unit 9 is hence able to process and store the liquefied gas. In FIG. 3 one a gas riser 8 is shown, connected, on one side, to the gas buffer reservoir 7 and to the other side to a buoy loading system comprising a disconnectable submerged buoy received in a submerged downwardly open receiving space at the bottom of the floating gas processing unit 9, so that the floating gas processing unit 9 is able to turn on the anchored central buoy member under the influence of wind, waves and water currents. The buoy 30 could be of a Submerged Turret Production type of buoy, a Submerged Turret Loading type of buoy which are well known.

By means of the STL/STP technique there is achieved that one is able to carry out loading/unloading as well as offshore production of liquefied gas in nearly all weathers, a connection as well as a disconnection between vessel 9 and buoy 30 being able to be carried out in a simple and quick manner, also under very difficult weather conditions with high waves. Further, the buoy 30 may remain connected to the vessel 9 in all weathers, a quick disconnection being able to be carried out if a weather limitation should be exceeded.

The LNG carrier 15 is weathervaning moored and can be disconnected and reconnected to the mooring system and the gas riser 8, so to store, transport and offload the produced liquefied gas to shore.

Figure 4:
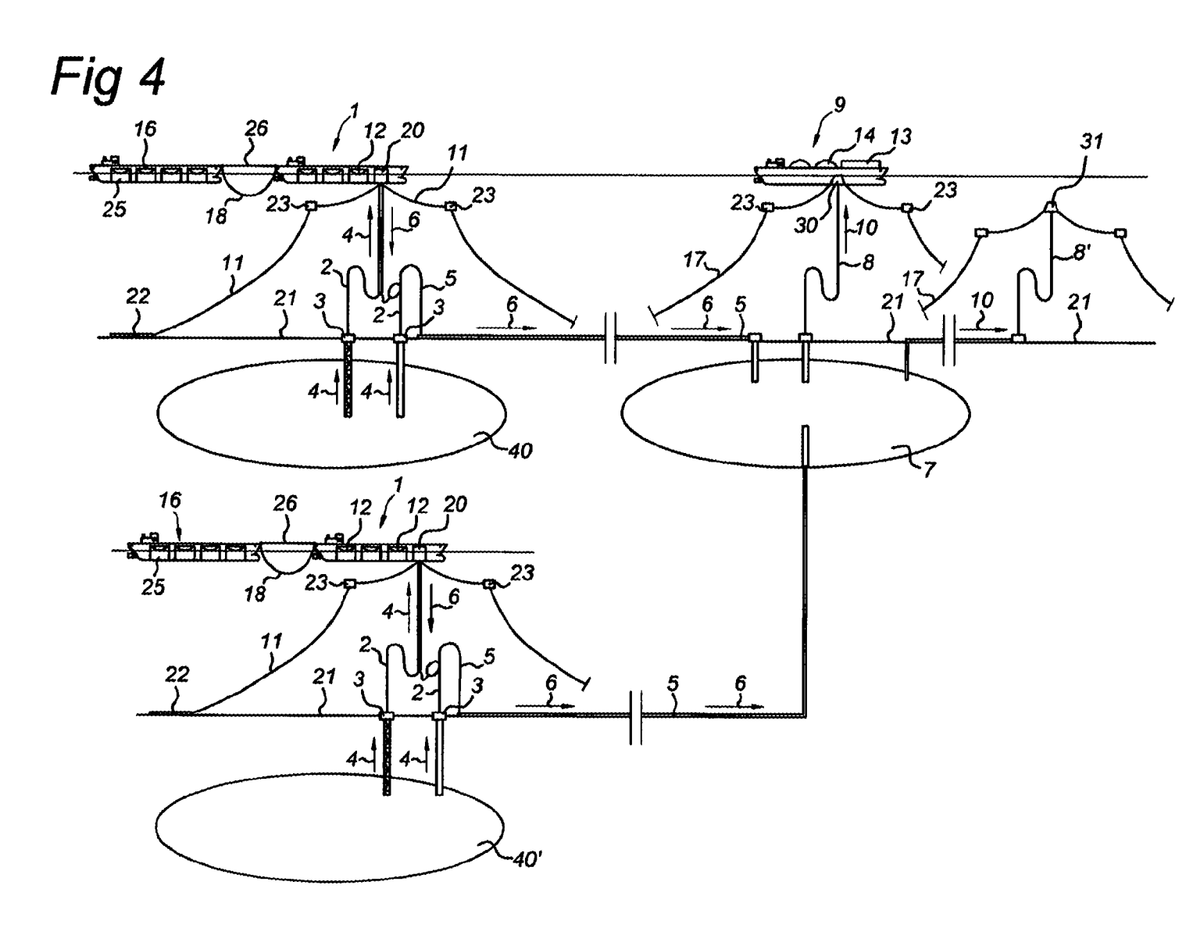
FIG. 4 shows a schematic view of a system according to the present invention where different connection points for the floating gas processing unit are shown.

FIG. 4 shows a schematic view of a system according to the present invention where different connection points for the floating gas processing unit 9 are shown. In this embodiment, as shown in FIG. 3, there are two floating hydrocarbon processing units 1, each moored to oil shutter tankers 16. In this case, the gas buffer reservoir 7 is connected to two gas export risers 5, each connected to one floating hydrocarbon processing unit 1. In this case as well the gas processing unit 9 is also a LNG carrier provided with a gas liquefaction plant 13, with some storage tanks 14. The floating gas processing unit 9 is hence able to process and store the liquefied gas In this embodiment there are two gas risers 8 shown, connected, on one side, to the gas buffer reservoir 7 and to the other side to a buoy loading system comprising a disconnectable submerged buoy 30, 31. The buoy 30 as shown in FIG. 3 is received in a submerged downwardly open receiving space at the bottom of the floating gas processing unit 9, so that the floating gas processing unit 9 is able to turn on the anchored central buoy member under the influence of wind, waves and water currents. Another floating gas processing unit could connect to the other submerged buoy 31, to process and store gas drawn from the gas buffer reservoir 7 via the other gas riser 8'.

In FIGS. 2 to 4 the floating gas processing unit 9 is moored to the seabed 21 with a similar mooring system as the one described in FIG. 2 for the floating hydrocarbon processing unit 1.

Figure 5:
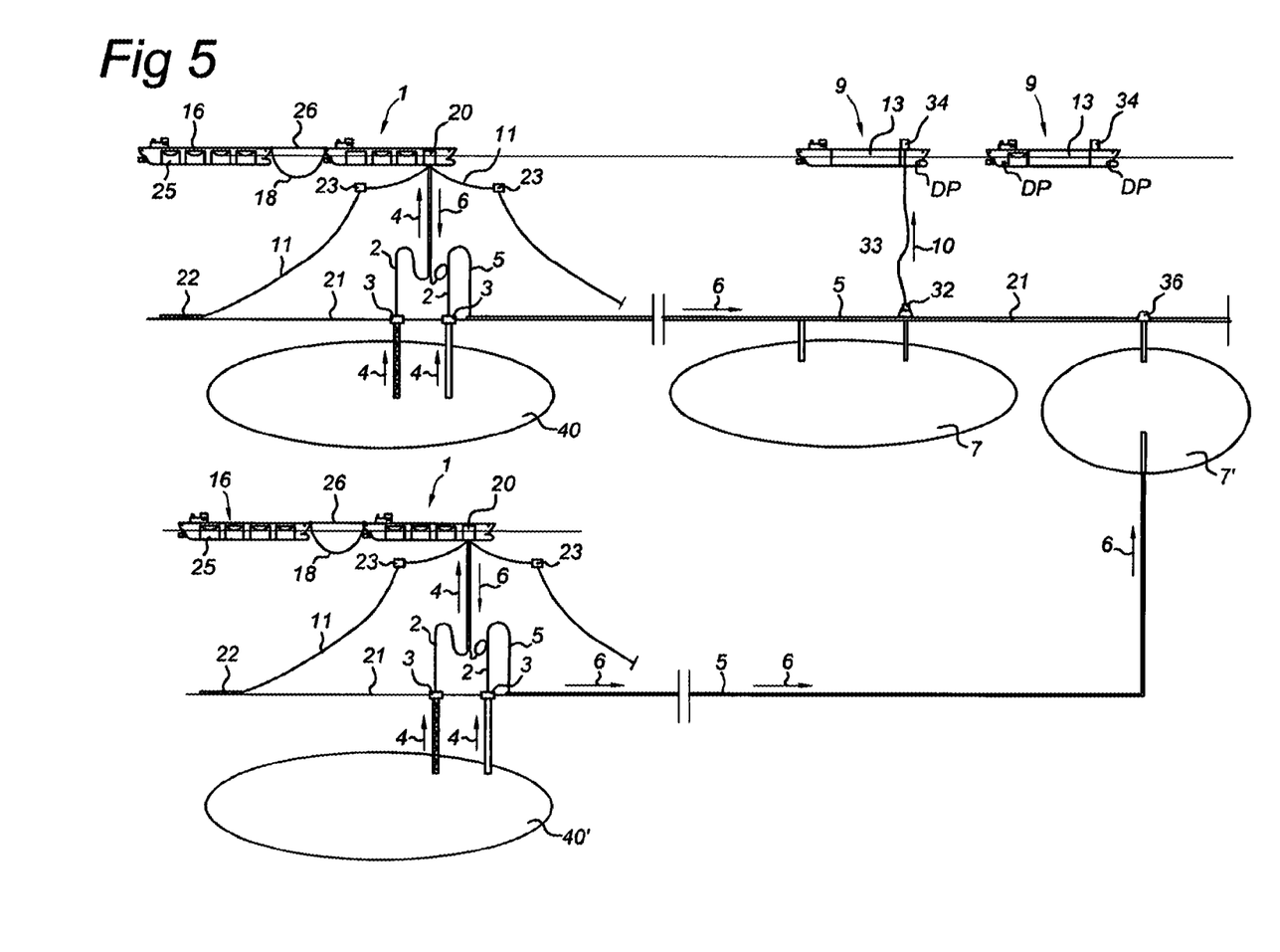
FIG. 5 shows a schematic view of a system according to the present invention where the system comprises two gas buffer reservoirs and where the floating gas processing unit is dynamically positioned and provided with a particular offshore loading system.

FIG. 5 shows a schematic view of a system according to the present invention where the system comprises two gas buffer reservoirs 7 and 7' and where there are two floating gas processing units 9 which are dynamically positioned and provided with a particular offshore loading system. In this embodiment, the floating gas processing unit 9 is provided with a flexible loading system for a dynamically positioned vessel (DP) comprising a base 32 firmly attached to the seabed 21 and forming an interface between the buffer well head 36 and a flexible flowline 33 and having a substantially vertical outlet to which the flexible flowline is connected. The flowline 33 is positively buoyant such that it rises substantially vertically from the base 32 to the surface of the sea, its length being substantially greater than the depth of the sea such that the upper portion floats on the sea surface, a storage reel 34 rotatably mounted on the floating gas processing unit to which the upper end of the flowline 33 can be releasably connected such that the flowline 33 may be reeled in or out depending on the position of the vessel relative to the base.

In this case, as shown in FIG. 4, two floating gas processing units 9 cam work at the same time, each drawing gas from one gas buffer reservoir 7 and 7'. Alternatively, the gas processing unit 9 can first liquefy some gas from one gas buffer reservoir 7, then disconnect and reconnect to the other gas buffer reservoir 7'.

According to the invention, the floating gas processing unit 9 is disconnectable from a mooring system (when moored to the seabed) and a first gas riser 8 that is connected to a first gas buffer reservoir 7 and can be connected to a second mooring system (when moored to the seabed) and a second gas riser 8' that is connected to a second buffer reservoir 7', for receiving and liquefying of temporary stored gas.

In the shown embodiments, offloading form a production unit to a tanker is done in a tandem configuration, however according to the present invention the transfer between two vessels is not only limited to tandem offloading configuration, but can also be side-by-side.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The invention claimed is:

1. A system for the development of one or more offshore hydrocarbon fields comprising:
   at least one floating hydrocarbon processing unit (1) that is moored to a seabed (21) and connected to a hydrocarbon reservoir (40) via a riser (2) and a wellhead (3) on the seabed, the floating hydrocarbon processing unit (1) receiving and processing a hydrocarbon mixture received from the hydrocarbon reservoir (40) via the riser (2), the floating hydrocarbon processing unit (1) being provided with process equipment adapted to separate all of the received hydrocarbon mixture into an oil fraction, a water fraction, and a gas fraction and provided with rectangular storage tanks (12) adapted for storage of the separated oil fraction of the mixture at or near ambient pressure,
   a gas storage buffer reservoir (7) placed at a certain distance from and isolated from the hydrocarbon reservoir (40)
   a gas export riser (5) connected to the floating hydrocarbon processing unit (1) and the gas storage buffer reservoir (7) to export the separated gas fraction of the mixture from the floating hydrocarbon processing unit (1) and inject the separated gas fraction of the mixture into the gas storage buffer reservoir (7) for temporary storage of the separated gas fraction of the mixture,
   a gas riser (8) connected with one end to the gas storage buffer reservoir (7) and with another end connected to a floating gas processing unit (9) for processing the separated gas received from the gas storage buffer reservoir (7) so that the processed separated gas can be transported to shore,
   wherein the gas buffer reservoir, serving as temporary storage of the produced gas in case of production interruption on either the floating hydrocarbon processing unit (1) or the floating gas processing unit (9), controls the gas flow between the floating hydrocarbon processing unit (1) and the floating gas processing unit (9) working in conjunction, with no interdependence between the activities of the hydrocarbon processing unit (1) and the gas processing unit (9),
   wherein the floating gas processing unit (9) comprises a gas liquefaction plant (13) that processes and stores produced liquefied gas,
   at least one oil shuttle tanker (16) adapted to transport the separated oil from the floating hydrocarbon processing unit (1) in rectangular tanks at or near ambient pressure, and
   at least one LNG shuttle tanker (15) that transports the produced liquefied gas, from the floating gas processing unit (9).

2. The system according to claim 1, comprising at least two of said floating hydrocarbon processing units (1) wherein the gas export riser (5) from each of the floating hydrocarbon processing units (1) are connected to one another before reaching the gas storage buffer reservoir (7) or each have an independent connection to the gas storage buffer reservoir (7).

3. The system according to claim 1, wherein the floating gas processing unit (9) is moored in a weathervaning manner and can be disconnected and reconnected to a mooring system and the gas riser (8), to store, transport and offload liquefied gas to shore.

4. The system according to claim 1, wherein the gas storage buffer reservoir (7) is an underground/subsurface reservoir.

5. The system according to claim 1, wherein the gas storage buffer reservoir (7) is a depleted well or a salt cavern.

6. The system according to claim 1, wherein the floating gas processing unit (9), for receiving and liquefying of temporary stored gas, is disconnectable from a mooring system and a first gas riser (8) that is connected to the gas storage buffer reservoir (7) and can be connected to a second mooring system and a second gas riser (8') that is connected to another of said gas storage buffer reservoir (7') isolated from and placed at a distance from the gas storage buffer reservoir.

7. The system according to claim 1, wherein,
the gas storage buffer reservoir (7) is an undersea reservoir isolated from the hydrocarbon reservoir (40).

8. A method of receiving, processing and distributing a hydrocarbon mixture collected from a hydrocarbon reservoir (40), comprising the steps of:
receiving, via a riser (2), a hydrocarbon mixture at at least one floating hydrocarbon processing unit (1) that is moored to a seabed (21),
processing, on the floating hydrocarbon processing unit (1), to separate all of the received hydrocarbon mixture into an oil fraction, a water fraction, and a gas fraction,
storing the separated oil fraction of the mixture at or near ambient pressure in rectangular storage tanks (12) provided on the floating hydrocarbon processing unit (1),
exporting the separated gas fraction of the mixture from the floating hydrocarbon processing unit (1) to a gas storage buffer reservoir (7) placed at a certain distance from and isolated from the hydrocarbon reservoir (40) for temporary storage of the separated gas fraction of the mixture,
transferring the separated gas via a gas riser (8) from the gas storage buffer reservoir (7) to a floating gas processing unit (9),
in case of production interruption on either the floating hydrocarbon processing unit (1) or the floating gas processing unit (9), controlling, via the gas buffer reservoir serving as temporary storage of the produced gas, the gas flow between the floating hydrocarbon processing unit (1) and the floating gas processing unit (9) working in conjunction, with no interdependence between the activities of the hydrocarbon processing unit (1) and the gas processing unit (9),
processing the separated gas received from the gas storage buffer reservoir (7) on board the floating gas processing unit (9), and
transporting the processed separated gas to shore,
wherein the floating gas processing unit (9) comprises and uses a gas liquefaction plant (13) to process and store produced liquefied gas,
wherein at least one oil shuttle tanker (16) transports the separated oil from the floating hydrocarbon processing unit (1) in rectangular tanks at or near ambient pressure, and
wherein at least one LNG shuttle tanker (15) transports the produced liquefied gas, from the floating gas processing unit (9).

9. The method according to claim 8, wherein the floating gas processing unit (9) is separated with respect to the floating hydrocarbon processing unit (1).

10. The method according to claim 8, wherein the gas storage buffer reservoir (7) is an underground/subsurface reservoir isolated from the hydrocarbon reservoir (40).

11. The method according to claim 8, wherein the gas storage buffer reservoir (7) is a depleted well isolated from the hydrocarbon reservoir (40).

12. The method according to claim 8, wherein the gas storage buffer reservoir (7) is a salt cavern isolated from the hydrocarbon reservoir (40).

13. The method according to claim 8, wherein,
the gas storage buffer reservoir (7) is an undersea reservoir isolated from the hydrocarbon reservoir (40), and
a gas export riser (5) connected to the floating hydrocarbon processing unit (1) is used for introducing and temporarily storing the gas, separated from the received hydrocarbon mixture, in the gas storage buffer reservoir (7).

14. A method of receiving, processing and distributing a hydrocarbon mixture collected from a hydrocarbon reservoir, comprising the steps of:
using a floating liquefaction unit (9) in conjunction with a floating hydrocarbon processing unit (1) to separate oil and gas extracted from an underground hydrocarbon reservoir (40) and then inject, for temporary storage, the separated gas into a gas storage buffer reservoir (7) that is an undersea reservoir isolated from the underground hydrocarbon reservoir, including:
receiving, via a riser (2) feeding from the underground reservoir, a hydrocarbon mixture of the oil and the gas at the floating hydrocarbon processing unit,
processing the oil and the gas on the floating hydrocarbon processing unit to separate all of the received hydrocarbon mixture into an oil fraction, a water fraction, and a gas fraction,
storing the separated oil fraction of the mixture, at or near ambient pressure, in rectangular storage tanks (12) on the floating hydrocarbon processing unit and then using an oil shuttle tanker (16) to transport the separated oil fraction of the mixture from the floating hydrocarbon processing unit (1) in rectangular tanks at or near ambient pressure,
using a gas export riser (5) connected to the floating hydrocarbon processing unit (1), injecting and temporarily storing the separated gas fraction of the mixture into the gas storage buffer reservoir (7) for temporary storage of the separated gas fraction of the mixture,
transferring the temporarily stored separated gas, via a mobile gas riser (8), from the gas storage buffer reservoir (7) to a floating gas processing unit (9),
in case of production interruption on either the floating hydrocarbon processing unit (1) or the floating gas processing unit (9), controlling, via the gas buffer reservoir serving as a temporary buffer storage of the produced gas, the gas flow between the floating hydrocarbon processing unit (1) and the floating gas processing unit (9) working in conjunction, with no interdependence between the activities of the hydrocarbon processing unit (1) and the gas processing unit (9),
processing the separated gas received from the gas storage buffer reservoir (7) on board the floating gas processing unit (9) using a gas liquefaction plant (13) to process and store produced liquefied gas, and transporting the processed separated gas to shore using a LNG shuttle tanker (15) to transport the produced liquefied gas from the floating gas processing unit (9).

\* \* \* \* \*